United States Patent
Bruner et al.

(10) Patent No.: US 9,671,959 B2
(45) Date of Patent: Jun. 6, 2017

(54) TIERED SUB-UNIT THROUGHPUTS IN MASS STORAGE ASSEMBLIES

(71) Applicant: HGST NETHERLANDS B.V., Amsterdam (NL)

(72) Inventors: Curtis H. Bruner, Niwot, CO (US); Christopher J. Squires, Boulder, CO (US)

(73) Assignee: WESTERN DIGITAL TECHNOLOGIES, INC., Irvine, CA (US)

(*) Notice: Subject to any disclaimer, the term of this patent is extended or adjusted under 35 U.S.C. 154(b) by 113 days.

(21) Appl. No.: 14/558,329

(22) Filed: Dec. 2, 2014

(65) Prior Publication Data

US 2016/0154609 A1  Jun. 2, 2016

(51) Int. Cl.
*G06F 13/38* (2006.01)
*G06F 3/06* (2006.01)

(52) U.S. Cl.
CPC .......... *G06F 3/0607* (2013.01); *G06F 3/0613* (2013.01); *G06F 3/0632* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 5,812,754 A | 9/1998 | Lui et al. | |
| 7,008,234 B1 | 3/2006 | Brown | |
| 7,200,008 B1 | 4/2007 | Bhugra | |
| 7,506,127 B2 | 3/2009 | Reger et al. | |
| 8,275,967 B2 | 9/2012 | Harris | |
| 8,924,610 B1 * | 12/2014 | Carr | H04L 67/1097 710/10 |
| 2014/0258609 A1 * | 9/2014 | Cui | G06F 3/061 711/113 |
| 2015/0081989 A1 * | 3/2015 | Lee | G06F 12/0607 711/157 |

OTHER PUBLICATIONS

"3956-CS8 cache controller small form-factor pluggable modules." TS7700 Service Information Center 2.0.0.1. IBM Corporation, 2011. www.pic.dhe.ibm.com/infocenter/ts7700/serv/index.jsp?topic=%2Fcom.ibm.storage.ts7740.service20.doc%2Fds4200_sfp_modules_cs8.htm.

(Continued)

*Primary Examiner* — Ilwoo Park

(57) ABSTRACT

Tiered mass storage assemblies are presented. The mass storage assembly in one example includes a plurality of drive interfaces configured to couple to a plurality of storage devices, with each drive interface of the plurality of drive interfaces being configured to exchange digital data at a predetermined maximum interface throughput, one or more low-output storage drives coupled to one or more corresponding drive interfaces, with a low-output storage drive exchanging digital data using the predetermined maximum interface throughput, and one or more high-output storage drives, with each high-output storage drive of the one or more high-output storage drives being coupled to two or more drive interfaces and with a high-output storage drive exchanging digital data using two or more predetermined maximum interface throughputs of the two or more drive interfaces.

16 Claims, 5 Drawing Sheets

(56) References Cited

OTHER PUBLICATIONS

"IBM TotalStorage DS3512." Great Lakes Computer, 2011-2014. www.glcomp.com/products/storage/disk-storage/ibm-totalstorage/ds3500/ds3512.

"Iomega StorCenter px12-350r Rack Mount 8TB Network Storage Array—35721." Broad Band Buyer. www.broadbandbuyer.co.uk/Shop/ShopDetail.asp?ProductID=12413.

* cited by examiner

US 9,671,959 B2

TIERED SUB-UNIT THROUGHPUTS IN MASS STORAGE ASSEMBLIES

TECHNICAL FIELD

Aspects of the disclosure are related to the field of data storage systems, and in particular, to mass storage assemblies.

TECHNICAL BACKGROUND

Mass storage systems are used for storing enormous quantities of digital data. As computer systems and networks grow in numbers and capability, there is a need for more and more storage capacity. Cloud computing and large-scale data processing have further increased the need for digital data storage systems capable of transferring and holding immense amounts of data.

Mass storage systems are typically formed using a number of mass storage chassis assemblies. A mass storage assembly is a modular unit that holds and operates a number of storage devices. The capacity of a mass storage system can be increased in large increments by the installation of an additional mass storage assembly or assemblies to a rack or other support structure.

A storage device or devices of a mass storage assembly can be replaced if a drive failure occurs. It is important to be able to repair or reconfigure a mass storage assembly. The storage devices of a mass storage assembly may be replaced while the mass storage assembly is operational.

OVERVIEW

A mass storage assembly is provided. The mass storage assembly in one example includes a plurality of drive interfaces configured to couple to a plurality of storage devices, with each drive interface of the plurality of drive interfaces being configured to exchange digital data at a predetermined maximum interface throughput, one or more low-output storage drives coupled to one or more corresponding drive interfaces, with a low-output storage drive exchanging digital data using the predetermined maximum interface throughput, and one or more high-output storage drives, with each high-output storage drive of the one or more high-output storage drives being coupled to two or more drive interfaces and with a high-output storage drive exchanging digital data using two or more predetermined maximum interface throughputs of the two or more drive interfaces.

DETAILED DESCRIPTION

The various examples provided herein, mass storage assemblies are included that comprise one or more storage drives, such as hard disk drives, solid state storage drives, optical storage drives, or other mass storage drives, including combinations thereof. These mass storage assemblies can be included in larger mass storage systems that include many mass storage assemblies, such as in a computing rack in a data center. However, in many examples of mass storage assemblies, a predetermined number of storage drives each operate at a predetermined interface throughput. When one or more of these storage drives fail, identical or equivalent storage drives can be used to replace the failed drives. However, as storage technologies advance, equivalent or identical storage drives might not be desirable as replacement drives.

In the examples herein, tiered storage assemblies are discussed. These tiered storage assemblies have a plurality of sub-units, such as rows, that contain one or more storage drives. These rows of storage assemblies are typically pre-configured with identical maximum drive interface throughputs, and thus each storage drive in a storage assembly operates at the same interface throughput. However, the examples herein include tiered storage assemblies which have ones of the sub-units or rows with different maximum drive interface throughputs. In this manner, some of the rows of a storage assembly can have higher throughput interfaces provisioned than other rows of the storage assembly. If any of the storage drives of a higher throughput rows fails, then a faster throughput storage drive can replace the failed storage drive and operate at a faster throughput. In other examples, more than one failed storage drive can be replaced by a single faster throughput storage drive that can utilize more than one storage interface concurrently.

Figure 1:
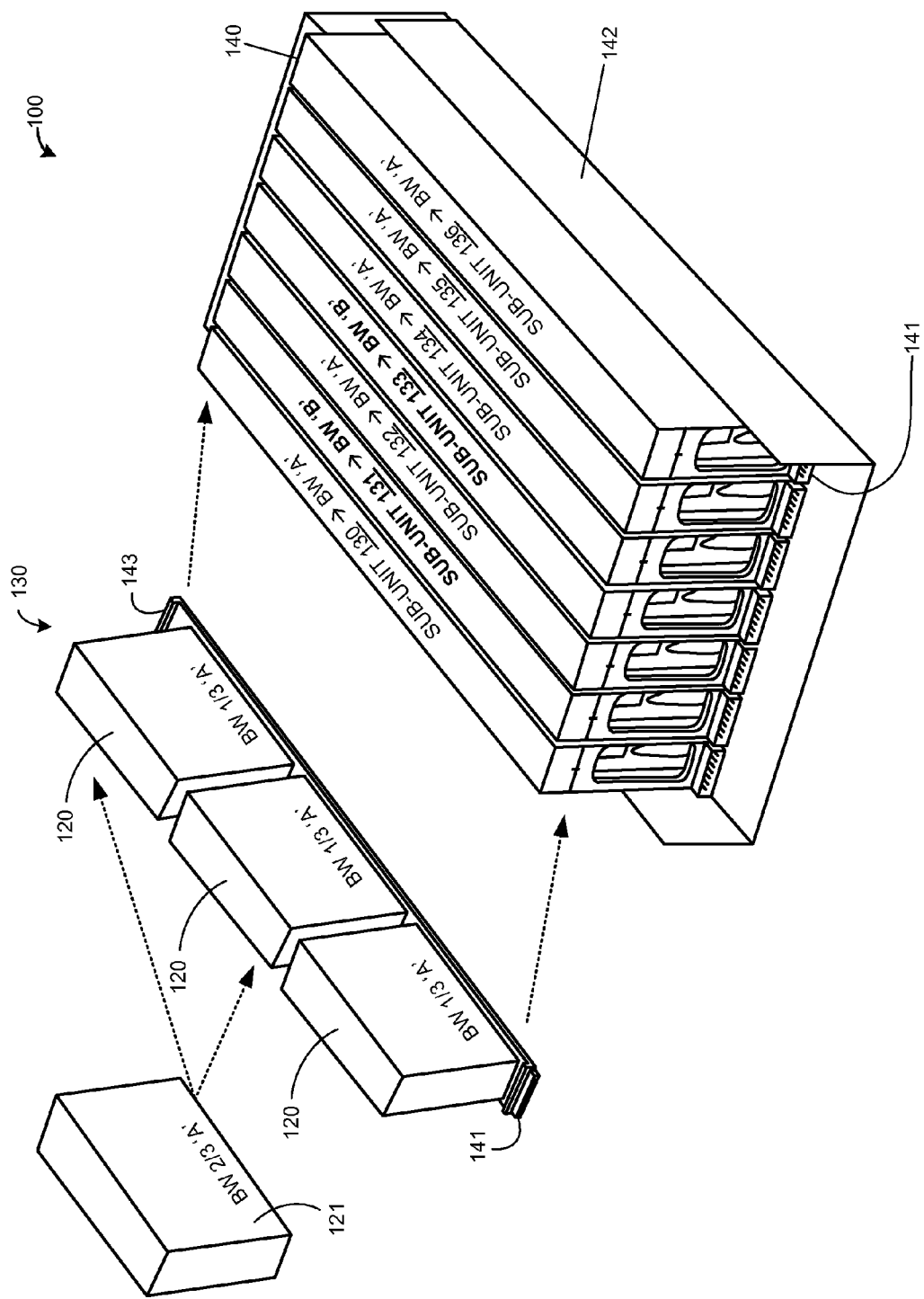
FIG. 1 shows a mass storage assembly configured to receive a plurality of storage sub-assemblies.

As a first example of a tiered storage assembly, FIG. 1 is presented. FIG. 1 is a system diagram illustrating storage assembly 100. Storage assembly 100 includes one or more rows of storage sub-units 130-136, interface connectors 141, and chassis 142. Each sub-unit, such as detailed in sub-unit 130, includes one or more storage drives 120 which couple electrically and mechanically to interface board 143. Each interface board 143 includes connector 141. Connector 141 can be electrically coupled to an external bus, network, or system. Each sub-unit can further include an enclosure 140 as seen in FIG. 100 but omitted from the detailed view of sub-unit 130 for clarity. Replacement storage drive 121 can replace one or more of storage drives 120 in sub-unit 130, as discussed below.

Chassis 142 can be used with any number of storage sub-units installed. Chassis 142 can include mechanisms or features for installing chassis 142 into a rack, system, or other receptacle or structure. Chassis 142 can include an enclosure for encasing the various sub-units of storage assembly 100. The assembled mass storage assembly 100 comprises a modular storage system. The mass storage assembly 100 can be quickly and easily installed to (or removed from) a data storage system. The mass storage assembly 100 is substantially self-contained, wherein electrical power and data exchange can be accomplished through the connectors 141.

In FIG. 1, each sub-unit 130-136 has an associated bandwidth (BW) or throughput associated therewith. This bandwidth comprises a predetermined maximum bandwidth for a storage interface for each sub-unit. Specifically, two example bandwidths are shown, namely bandwidth 'A' and bandwidth 'B'—with certain sub-units having bandwidth A and other sub-units having bandwidth B. Bandwidth A can comprise a first throughput in gigabytes per second, while bandwidth B can comprise a second throughput in gigabytes per second that is higher than bandwidth A. Other bandwidth configurations are possible.

In the detailed view of sub-unit 130, three storage drives 120 are shown, each with a maximum bandwidth indicated as one-third of the total bandwidth A of sub-unit 130. Sub-unit 130 is configured to have replacement storage drive 121 replace two of storage drives 120. Replacement storage drive 121 is configured to couple to two storage interfaces associated with two of storage drives 120. Replacement storage drive 121 also has a storage interface that can operate at a maximum bandwidth of two-thirds of the maximum bandwidth of sub-unit 130, or ⅔ A. In this manner, a single, faster bandwidth, storage drive can replace two or more of the slower bandwidth storage drives of sub-unit 130.

Figure 2:
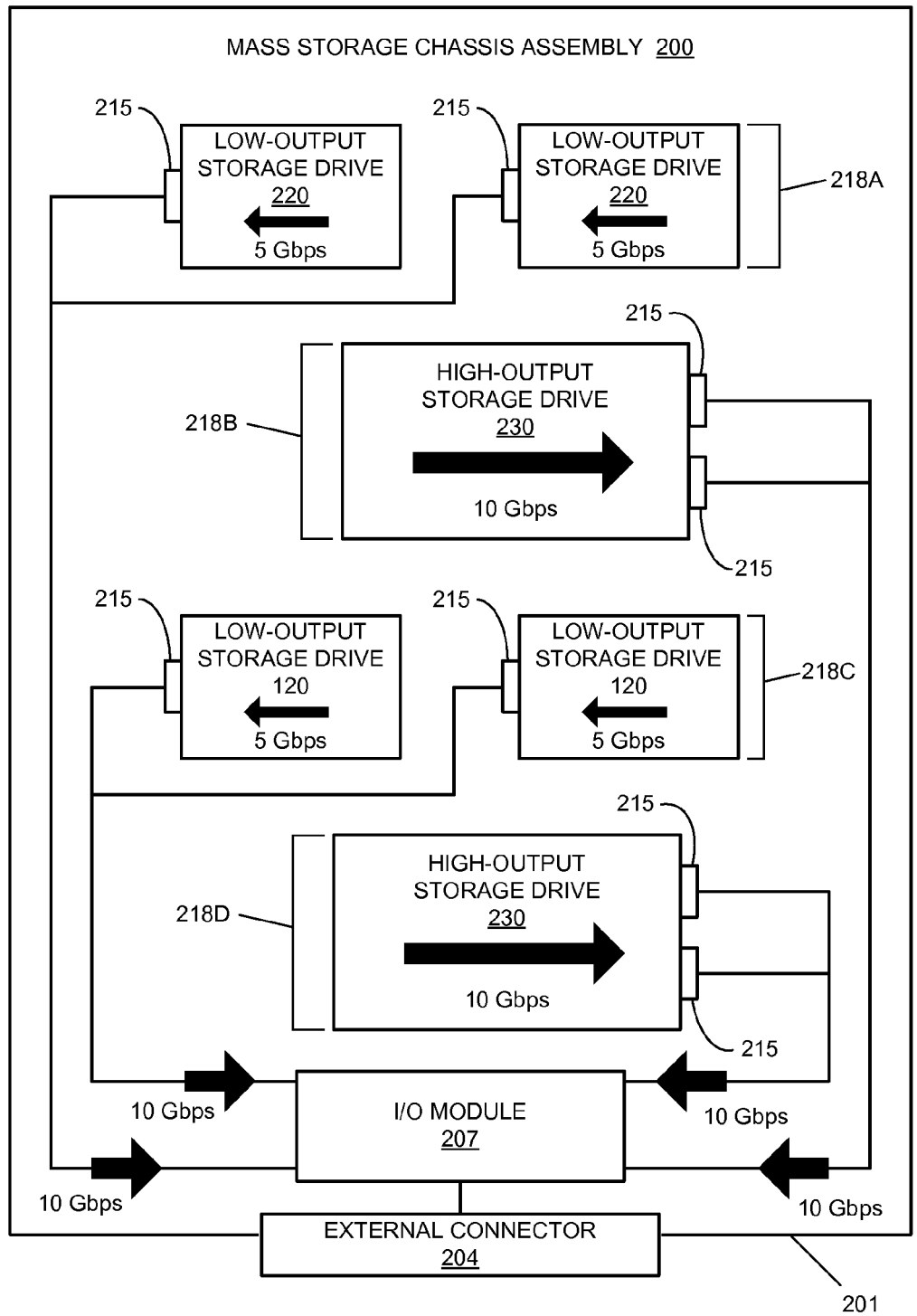
FIG. 2 shows a mass storage assembly configured to operate a predetermined number of storage drives.

To further illustrate the different bandwidths of storage assembly 100 with different bandwidth storage drives, FIG. 2 is presented. FIG. 2 shows mass storage assembly 200 configured to operate a plurality of storage drives. Mass storage assembly 200 in the example shown includes chassis 201 configured to receive and hold the plurality of storage drives. The mass storage assembly 200 comprises an Input/Output (I/O) module 207 coupled to an external connector 204, with the I/O module 207 configured to exchange digital data between the external connector 204 and the plurality of storage devices. The mass storage assembly 200 includes a plurality of drive interfaces 215 configured to couple to the plurality of storage devices, with each drive interface 215 of the plurality of drive interfaces 215 being configured to exchange digital data at a predetermined maximum interface throughput (also known as bandwidth). The mass storage assembly 200 includes one or more low-output storage drives 220 coupled to one or more corresponding drive interfaces 215, with a low-output storage drive 220 exchanging digital data using the predetermined interface throughput. The mass storage assembly 200 includes one or more high-output storage drives 230. Each high-output storage drive 230 of the one or more high-output storage drives 230 is coupled to two or more drive interfaces 215. A high-output storage drive 230 exchanges digital data using two or more predetermined interface throughputs of the two or more drive interfaces 215.

The chassis 201 receives and holds the plurality of storage drives, with the plurality of storage drives comprising one or both of the one or more low-output storage drives 220 and the one or more high-output storage drives 230. In some examples, the low-output storage drives 220 and/or the high-output storage drives 230 comprise storage devices including one or more disk storage media, such as a Hard Disk Drive (HDD). In some examples, the low-output storage drives 220 and/or the high-output storage drives 230 comprise solid-state digital storage elements, such as a Solid State Drive (SSD). Alternatively, in other examples the low-output storage drives 220 and/or the high-output storage drives 230 comprise hybrid drives including disk storage media and solid-state digital storage elements, such as a combination HDD and SSD.

The I/O module 207 is coupled to the external connector 204, wherein the external connector 204 is externally available and is configured to couple to an external device, system, bus, or other communication system or communication link. The I/O module 207 therefore is configured to interface between the storage drives and an external device, system, bus, or other communication link or communication system. The I/O module 207 includes the plurality of drive interfaces 215 configured to couple to the low-output storage drives 220 or to the high-output storage drives 230. The plurality of drive interfaces 215 comprise conductors and connector elements that extend from the I/O module 207.

The low-output storage drives 220 and/or the high-output storage drives 230 in some examples are organized into storage drive sub-groupings 218, with the storage drive sub-groupings 218 comprising horizontal rows 218 in the example shown. Each storage drive sub-grouping 218 is coupled to a corresponding drive interface 215 or to a corresponding set of drive interfaces 215. Alternatively, the low-output storage drives 220 and/or the high-output storage drives 230 can be arranged in other ways or can be arranged without any pattern or plan.

A low-output storage drive 220 can be replaced with a high-output storage drive 230. In some examples, an existing low-output storage drive or drives 220 can be replaced by a fewer number of high-output storage drives 230. A low-output storage drive or drives 220 can be replaced by a high-output storage drive 230 upon failure of the low-output storage drive or drives 220. A low-output storage drive 220 can alternatively be replaced by a high-output storage drive 230 in order to upgrade a capacity or performance of the mass storage assembly 200.

It is important to be able to repair or reconfigure a mass storage assembly. Further, as component storage devices are improved over time, previously-obtained mass storage chassis assemblies become obsolete. It may not be desirable to continue using previously-obtained mass storage chassis assemblies if the mass storage chassis assemblies are not designed and configured to be upgraded. Consequently, it is important to be able to maintain or even upgrade the mass storage assembly 200, such as by replacing low-output storage drives 220 with the same or fewer number of high-output storage drives 230.

In the example shown, two low-output storage drives 220 have been replaced by only one high-output storage drive 230 in rows 218B and 218D of the mass storage assembly 200. It can be seen that in both cases, two low-output storage drives 220 having 5 Gigabyte-per-second (Gbps) output rates have been replace by a single high-output storage drive 230 having a 10 Gbps output rate. Consequently, the throughput at a corresponding port or pin of the I/O module 207 remains substantially unchanged by the replacement. It should be understood that the figure is given merely for illustration and other storage drive examples, other storage drive arrangements, and other storage drive replacement scenarios are contemplated and are within the scope of the description and claims.

The plurality of drive interfaces 215 in some examples have fixed, substantially identical interface throughputs. For example, an individual drive interface 215 in some examples is coupled to an individual output port or pin of the I/O module 207. Alternatively, in other examples a sub-grouping 218 of drive interfaces 215 are coupled to an individual output port or pin of the I/O module 207. It should be understood that the plurality of drive interfaces 215 of drive sub-groupings 218 can have differing interface throughputs (see FIG. 3 and the accompanying discussion below). However, where two or more drive interfaces 215 are coupled to an output port or pin of the I/O module 207, then the combined throughput of the two or more drive interfaces 215 comprise the throughput that is available at the port or pin of the I/O module 207.

In some examples, the mass storage assembly 200 comprises a cold storage assembly 200. A cold storage assembly 200 stores digital data that is infrequently accessed. In a cold storage assembly 200, only a small percentage of the storage drives may be operating at any given time. Alternatively, the mass storage assembly 200 comprises a continuously-operated storage system.

Figure 3:
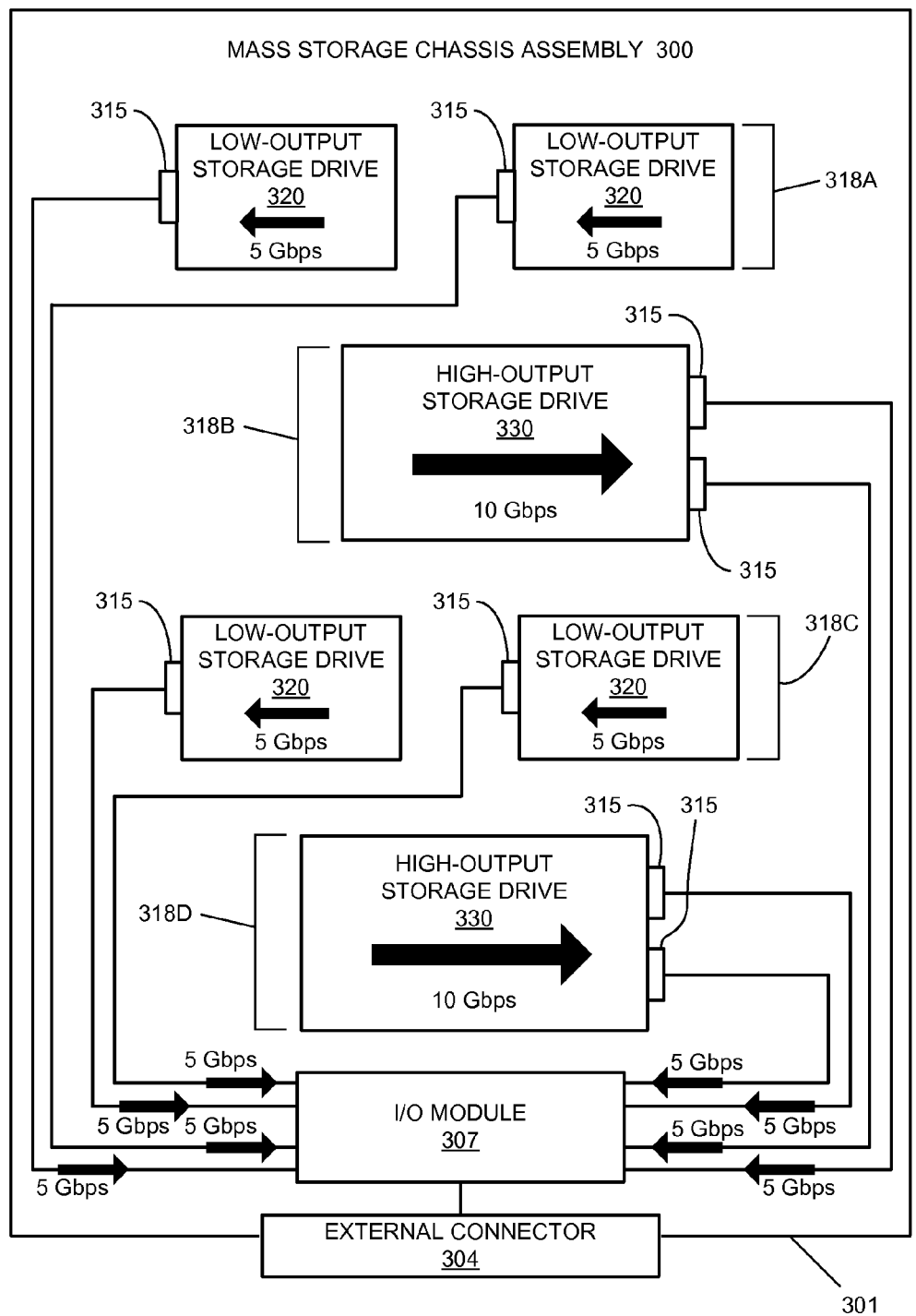
FIG. 3 shows a mass storage assembly configured to operate a predetermined number of storage drives in another example.

FIG. 3 shows a mass storage assembly 300 configured to operate a predetermined number of storage drives in another example. In this example, the mass storage assembly 300 includes the plurality of drive interfaces 315 configured to couple to the plurality of storage devices. Each drive interface 315 of the plurality of drive interfaces 315 is configured to exchange digital data at a predetermined interface throughput. The mass storage assembly 300 includes the one or more low-output storage drives 320 coupled to one or more corresponding drive interfaces 315. A low-output storage drive 320 exchanges digital data using the predetermined maximum interface throughput. The mass storage assembly 300 includes the one or more high-output storage drives 330. Each high-output storage drive 330 of the one or more high-output storage drives 330 is coupled to two or more drive interfaces 315. A high-output storage drive 330 exchanges digital data using two or more interface throughputs of the two or more drive interfaces 315. In contrast to FIG. 2, however, each drive interface 315 in this example is independent and is separately coupled to the I/O module 307. Each drive interface 315 is therefore coupled to a port or pin of the I/O module 307. For example, each drive interface 315 in some examples is coupled to an independent multiplexer output of the I/O module 307.

Each drive interface 315 can have a predetermined maximum interface throughput, as previously discussed. Each drive interface 315 can have an identical interface throughput in some examples. Alternatively, in other examples some or all of the drive interfaces 315 can have differing interface throughputs.

Figure 4:
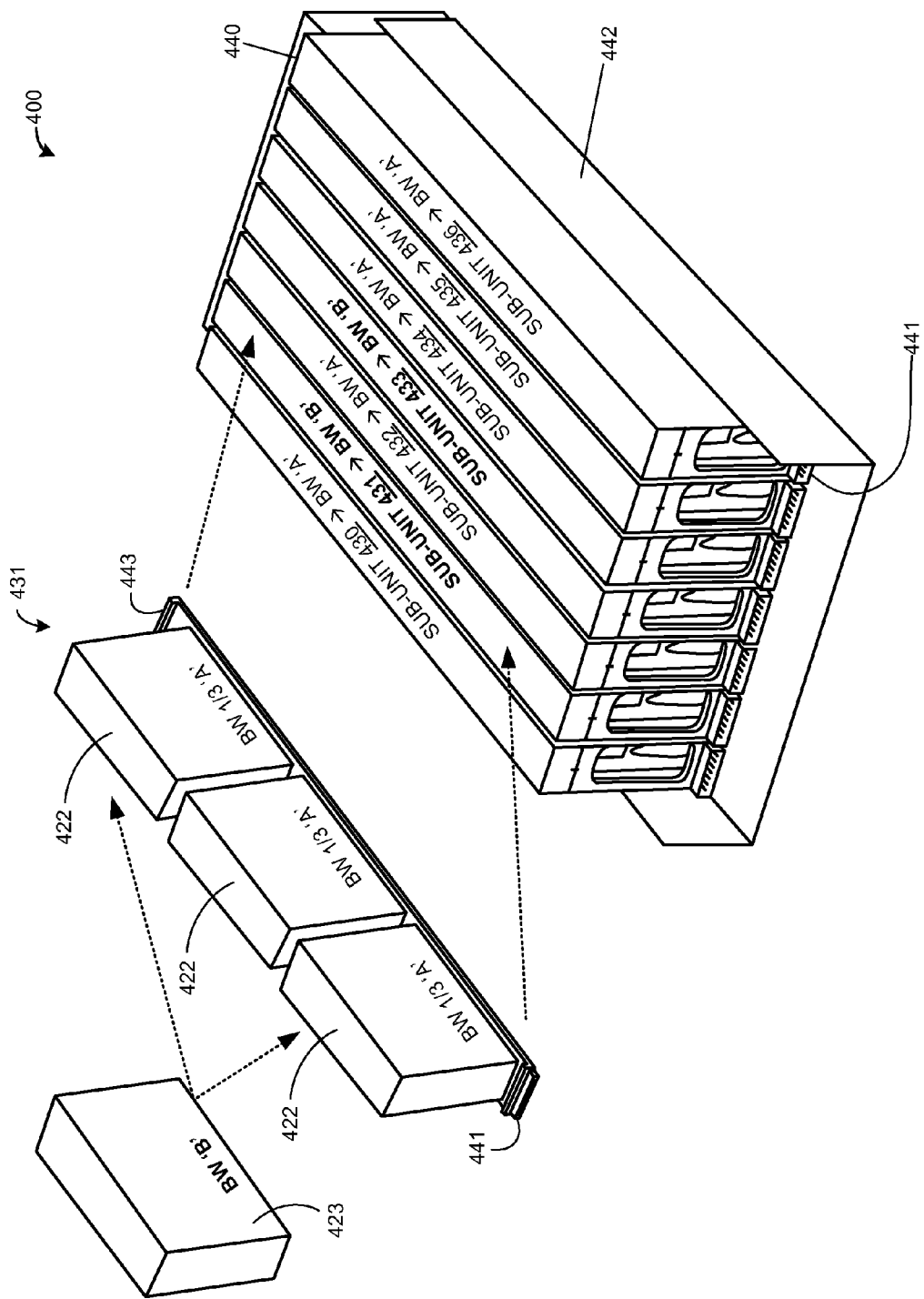
FIG. 4 shows a mass storage assembly configured to receive a plurality of storage sub-assemblies.

As a further example of a tiered storage assembly, FIG. 4 is presented. FIG. 4 can be another example configuration of storage assembly 100 of FIG. 1. Storage assembly 400 includes one or more rows of storage sub-units 430-436, interface connectors 441, and chassis 442. Each sub-unit, such as detailed in sub-unit 431, includes one or more storage drives 422 which couple electrically and mechanically to interface board 443. Interface board 443 includes connector 441. Connector 441 can be electrically coupled to an external bus, network, or system. Each sub-unit can further include an enclosure 440 as seen in FIG. 400 but omitted from the detailed view of sub-unit 430 for clarity. Replacement storage drive 423 can replace one or more of storage drives 422 in sub-unit 431, as discussed below.

Chassis 442 can be used with any number of storage sub-units installed. Chassis 442 can include mechanisms or features for installing chassis 442 into a rack, system, or other receptacle or structure. Chassis 142 can include an enclosure for encasing the various sub-units of storage assembly 400. The assembled mass storage assembly 400 comprises a modular storage system. The mass storage assembly 400 can be quickly and easily installed to (or removed from) a data storage system. The mass storage assembly 400 is substantially self-contained, wherein electrical power and data exchange can be accomplished through the connectors 441.

In FIG. 4, each sub-unit 430-436 has an associated bandwidth (BW) associated therewith. This bandwidth comprises a predetermined maximum bandwidth for a storage interface for each sub-unit. Specifically, two example bandwidths are shown, namely bandwidth 'A' and bandwidth 'B'—with certain sub-units having bandwidth A and other sub-units having bandwidth B. Bandwidth A can comprise a first throughput in gigabytes per second, while bandwidth B can comprise a second throughput in gigabytes per second that is higher than bandwidth A. Other bandwidth configurations are possible.

In the detailed view of sub-unit 431, three storage drives 422 are shown, each with a maximum bandwidth indicated as one-third of the total bandwidth A of sub-unit 431. Sub-unit 431 is configured to have replacement storage drive 423 replace three of storage drives 422. Replacement storage drive 423 is configured to couple to three storage interfaces associated with three of storage drives 422. Replacement storage drive 423 also has a storage interface that can operate at a maximum bandwidth of B. In this manner, a single, faster bandwidth, storage drive can replace three of the slower bandwidth storage drives of sub-unit 431.

Figure 5:
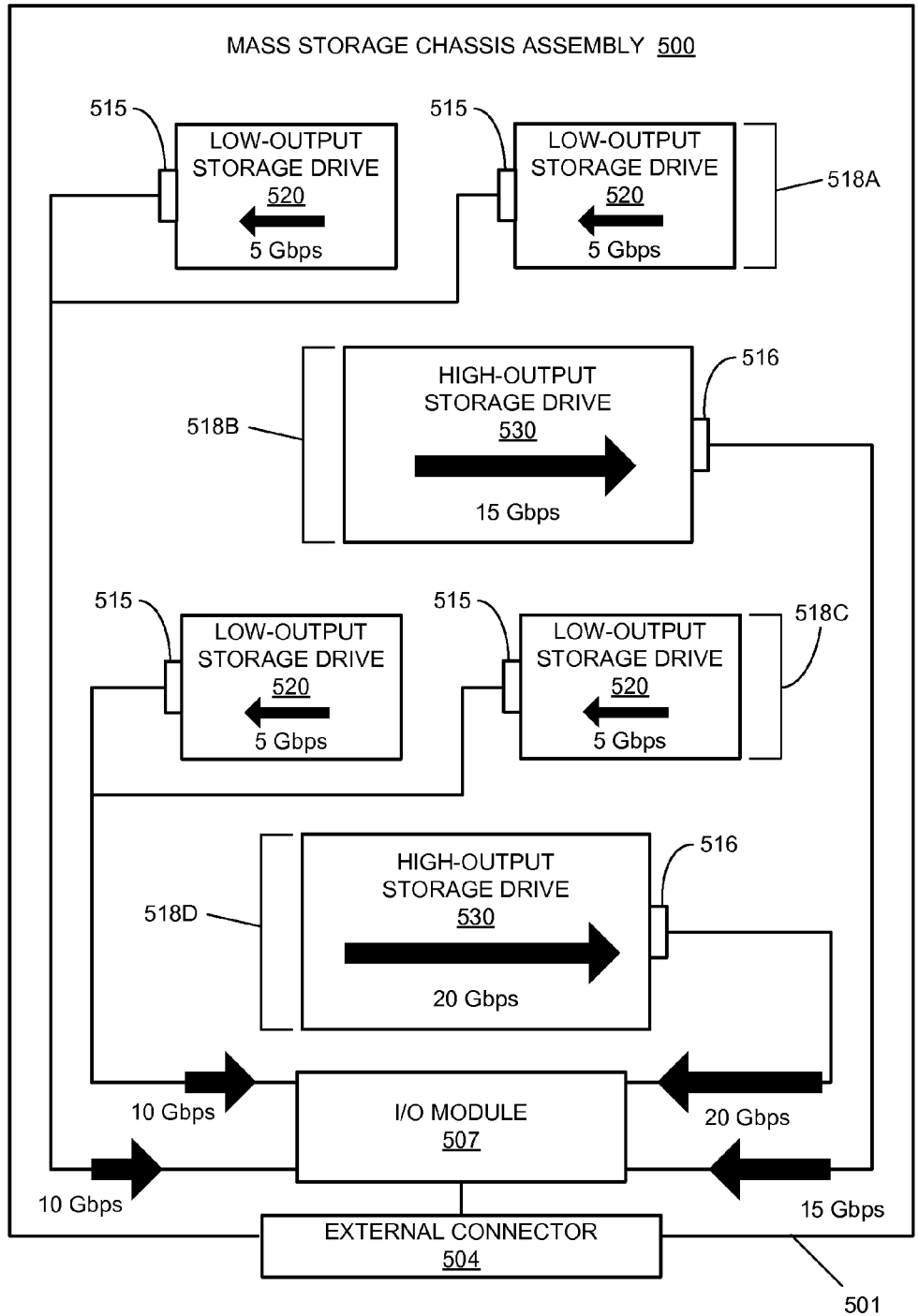
FIG. 5 shows a mass storage assembly configured to operate a predetermined number of storage drives in yet another example.

FIG. 5 shows a mass storage assembly 500 configured to operate a predetermined number of storage drives in yet another example. In this example, the mass storage assembly 500 includes at least first and second drive interfaces 515 configured to couple to at least first and second drive sub-groupings 518. The first drive interface 515 is configured to exchange digital data using a predetermined maximum first interface throughput and the second drive interface 516 is configured to exchange digital data using a predetermined maximum second interface throughput. The predetermined second interface throughput is different from the predetermined first interface throughput. The mass storage assembly 500 includes the first drive sub-grouping 518 comprising two or more low-output storage drives 520, with a low-output storage drive 520 of the first drive sub-grouping 518 exchanging digital data using the predetermined first interface throughput. The mass storage assembly 500 includes the second drive sub-grouping 518 comprising one or more high-output storage drives 530, with a high-output storage drive 530 of the second drive sub-grouping 518 exchanging digital data using the predetermined second interface throughput.

In this example, individual rows/sub-groupings 518 of the mass storage assembly 500 are given different throughputs. The sub-grouping 518B in the example is given a higher throughput than the sub-groupings 518A or 518C. For example, the first (or top) sub-grouping 518A has a sub-grouping throughput of 10 Gbps. Likewise, the third sub-grouping 518C has a sub-grouping throughput of 10 Gbps. In contrast, the second sub-grouping 518B has a sub-grouping throughput of 15 Gbps, while the fourth sub-grouping 518D has a sub-grouping throughput of 20 Gbps. As a result, the second sub-grouping 518B and the fourth sub-grouping 518D are more suited for replacement of low-output storage drives 520 with a high-output storage drive 530.

The included description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

What is claimed is:

1. A modular mass storage assembly, comprising:
   a plurality of drive interfaces configured to couple to a plurality of mass storage drives, wherein each drive interface of the plurality of drive interfaces has similar predetermined maximum drive interface throughputs;

one or more replaceable low-output mass storage drives comprising rotating magnetic storage media, wherein each low-output mass storage drive of the one or more low-output mass storage drives is coupled to one associated drive interface having the predetermined maximum drive interface throughput; and one or more replaceable high-output mass storage drives comprising solid state storage media, wherein each high-output mass storage drive of the one or more high-output mass storage drives is coupled to two or more drive interfaces each having the predetermined maximum drive interface throughput.

2. The modular mass storage assembly of claim 1, wherein each drive interface of the plurality of drive interfaces has the same predetermined maximum drive interface throughput.

3. The modular mass storage assembly of claim 1, wherein two or more drive interfaces of the plurality of drive interfaces have two or more differing predetermined maximum drive interface throughputs.

4. The modular mass storage assembly of claim 1, wherein the one or more low-output mass storage drives comprise one or more Hard Disk Drives.

5. The modular mass storage assembly of claim 1, wherein the one or more high-output mass storage drives comprise one or more Solid State Drives.

6. The modular mass storage assembly of claim 1, wherein the one or more high-output mass storage drives comprising one or more hybrid storage drives include a Hard Disk Drive component and a Solid State Drive component.

7. The modular mass storage assembly of claim 1, further comprising at least one modular sub-assembly having an associated maximum sub-assembly data throughput, wherein the modular sub-assembly comprises:

an associated plurality of drive interfaces individually supporting low-output mass storage drives that each operate at the predetermined maximum drive interface throughputs to provide the sub-assembly data throughput, wherein at least two of the low-output mass storage drives are replaceable with a single high-output mass storage drive configured to communicate over at least two of the drive interfaces previously associated with the at least two low-output mass storage drives.

8. The modular mass storage assembly of claim 1, wherein: one or both of the one or more low-output mass storage drives and the one or more high-output mass storage drives are arranged into two or more storage drive sub-groupings a first storage drive sub-grouping has a predetermined first sub-grouping throughput; and a second storage drive sub-grouping has a predetermined second sub-grouping throughput that differs from the predetermined first sub-grouping throughput.

9. The modular mass storage assembly of claim 1, wherein one or both of the one or more low-output mass storage drives and the one or more high-output mass storage drives are arranged into two or more storage drive sub-groupings a first storage drive sub-grouping has a predetermined first sub-grouping throughput; and a second storage drive sub-grouping has a predetermined second sub-grouping throughput that is greater than the predetermined first sub-grouping throughput.

10. The modular mass storage assembly of claim 1, further comprising an Input/Output (I/O) module coupled to the plurality of drive interfaces and configured to exchange digital data with the plurality of mass storage drives.

11. A mass storage assembly, comprising:

a rackmount chassis configured to carry a plurality of modular sub-assemblies;

each of the plurality of modular sub-assemblies configured to carry at least two storage drives, and comprising:

a sub-assembly interface having a predetermined maximum sub-assembly data throughput; and an associated plurality of drive interfaces individually supporting low-bandwidth storage drives each operating at a predetermined maximum drive interface throughput to provide the predetermined maximum sub-assembly data throughput, wherein at least two of the low-bandwidth storage drives are replaceable in an associated modular sub-assembly with a single high-bandwidth storage drive configured to communicate over at least two of the drive interfaces previously associated with the at least two low-bandwidth storage drives to provide the predetermined maximum sub-assembly data throughput.

12. The mass storage assembly of claim 11, wherein the low-bandwidth storage drives comprise Hard Disk Drives.

13. The mass storage assembly of claim 11, wherein the high-bandwidth storage drives comprise Solid State Drives.

14. The mass storage assembly of claim 11, wherein the high-bandwidth storage drive comprise a hybrid storage drive including a Hard Disk Drive component and a Solid State Drive component.

15. The mass storage assembly of claim 11, further comprising an Input/Output (I/O) module coupled to ones of the sub-assembly interfaces of the plurality of modular sub-assemblies and configured to exchange digital data with the at least two storage drives.

16. The mass storage assembly of claim 11, wherein: the low-bandwidth storage drives each comprise Hard Disk Drives; and the high-bandwidth storage drive comprises one of a Solid State Drive and a hybrid storage drive that includes a Hard Disk Drive component and a Solid State Drive component.

* * * * *